A. McINTURFF.
Meat Mincer.

No. 10,430.   Patented Jan. 17, 1854.

UNITED STATES PATENT OFFICE.

ABRAHAM McINTURFF, OF LIBERTY, VIRGINIA.

IMPROVEMENT IN MACHINES FOR MINCING MEAT.

Specification forming part of Letters Patent No. 10,430, dated January 17, 1854.

*To all whom it may concern:*

Be it known that I, ABRAHAM MCINTURFF, of Liberty, in the county of Shenandoah and State of Virginia, have invented a new and useful Improvement in Machines for Cutting and Mincing Meat; and I do hereby declare that the following is a full, clear, and exact description of the construction and operation of the same, reference being had to the annexed drawings, forming part of this specification, in which—

Figure 1:
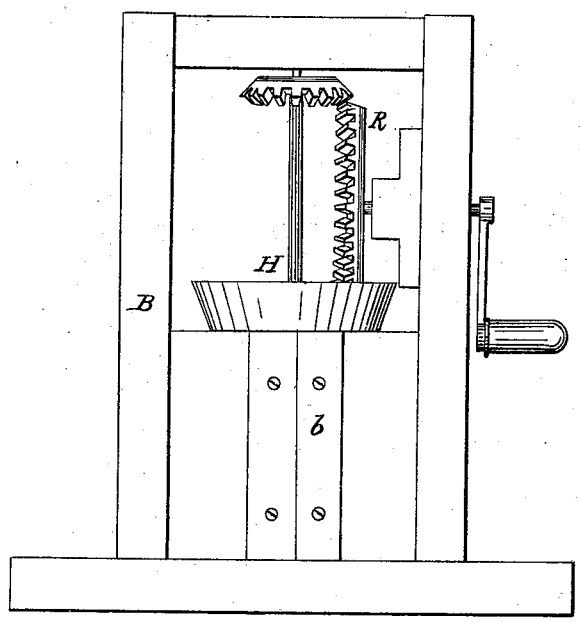
Figure 2:
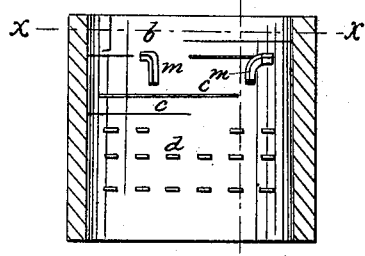
Figure 3:
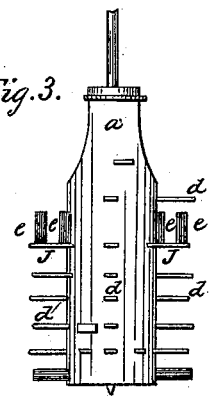
Figure 4:
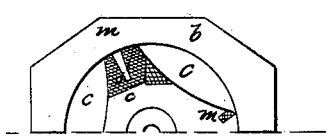
Figure 5:
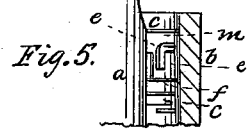

Figure 1 is a front elevation of the machine. Fig. 2 is an interior elevation of the cylinder $b$. Fig. 3 is an elevation of the mincing-shaft. Fig. 4 is a section on $xx$ of Fig. 2. Fig. 5 is a section on $yy$ of Fig. 2, the shaft $a$ being in position.

Similar letters of reference in the several figures indicate the same part of the machine.

My invention consists in the employment, in connection with the ordinary cutters upon the cylinder and shaft, of vertical and horizontal knives upon the surface of the revolving shaft, between which, at each revolution of the shaft, pass guides or holders attached to and projecting from the interior of the cylinder for facilitating the mincing by the action of three cutters running in different directions, and against which the meat is carried by the guides or holders, as will hereinafter be described.

In the drawings, $a$ is the shaft, and $b$ the mincing-cylinder, both armed with the cutters $c$ and $d$, arranged so as to pass close to each other by the revolution of the shaft. This, however, is a common arrangement in machines of this character and does not require particular explanation.

The principal feature of my improved machine consists in the employment of the groups of knives $e$ and $f$, one placed horizontally and the other two vertically upon the revolving shaft $a$.

Projecting from the interior surface of the cylinder are the guides or holders $m$, which, by the revolution of the shaft $a$, pass between the knives $f$ of the cylinder. The cylinder rests in the frame B, which supports the beveled cog-wheel R, giving motion to the shaft $a$.

The operation of my improved meat-cutter is as follows: The meat enters the machine by the hopper H, and by the action of the large cutters is reduced to strips, which, passing down in front of the holders $m$, are caught by the knives $e$ and $f$ and immediately reduced to small fragments, which are completely minced by the smaller knives below and issue from the bottom of the machine suitable for use.

The advantage of this machine consists in the rapidity and effectiveness of its operation, the position of the knives $e$ and $f$ and the employment of the holders $m$ giving it a decided superiority over machines which operate solely with simple cutters.

What I claim as my invention, and desire to secure by Letters Patent, is—

The employment of the compound cutters $ef$, as herein described, in combination with the holders $m$, operating substantially as and for the purposes fully set forth.

In testimony whereof I have hereunto signed my name before two subscribing witnesses.

ABRAHAM McINTURFF.

Witnesses:
ADDISON MUNCH,
HENRY CULLERS.